March 31, 1964     J. D. ABELES     3,127,341

FILTER

Filed Sept. 24, 1959

JAMES D. ABELES
INVENTOR.

BY *Lawrence J. Winter*

ATTORNEY

United States Patent Office 3,127,341
Patented Mar. 31, 1964

3,127,341
FILTER
James D. Abeles, Mendham, N.J., assignor to Purolator Products, Inc., Rahway, N.J., a corporation of Delaware
Filed Sept. 24, 1959, Ser. No. 842,071
3 Claims. (Cl. 210—493)

The present invention relates to a filter and more particularly to a full flow filter.

It is a common practice with high power internal combustion engines today to clean the engine lubricating oil by passing the entire flow of circulating oil through a full flow filter during operation of the engine while in the past it was common to flow only a small portion of oil at a time through the filter with the remaining portion of the oil being continuously recirculated from the engine crankcase to the engine parts without any filtering thereof. Eventually all of the oil was progressively filtered since the portion which had by-passed the filter previously would be subsequently passed therethrough.

With the advent of more high power engines, this provision of the full flow filter in the lubrication system of an internal combustion engine has followed since it is now necessary to obtain a high degree of filtration due to the closer engine tolerance requirements if all the engine parts are not to be subjected to excessive wear.

One difficulty encountered in flowing all of the lubricating oil from the crankcase continuously through the full flow filter is that the filter paper used in such a filter is of such high efficiency that when the engine is cold and the oil is more viscous, the high efficiency filter does not permit sufficient oil to pass through it quickly enough for proper lubrication of the engine. A by-pass relief valve is generally provided in the system which will open to prevent the engine from being completely starved of oil when the engine is cold, but this solution to the problem is not the ideal situation since unfiltered oil will pass to the engine parts carrying the contaminants therewith that cause excessive wear and hence the damage is done.

Another problem with a high efficiency full flow paper filter element used with high power engines at the present time is that it does not have a sufficient useful service life as a more coarse filter before a predetermined allowable pressure drop across it is reached due to contaminants clogging the filter and hence it is necessary to replace the filter more frequently.

An object of the present invention is to provide a full flow paper filter which will continuously filter the total flow of the circulated lubricating oil of an internal combustion engine regardless of whether the oil is cold or hot and which will further increase the useful service life of the filter element before it becomes clogged.

Another object of the present invention is to provide a full flow paper filter element which gives a good balance of useful service life and high efficiency filtration which removes substantially all of the contaminants carried in the oil stream.

Another object of the present invention is to provide a full flow paper filter element having different flow rate sections therein that can be easily manufactured from conventional equipment in use for other type paper filters without any modification of the manufacturing equipment.

Another object of the present invention is to provide a surface type full flow paper filter element which is provided with what is known as a by-pass flow rate section and a full flow rate section therein so that during cold starting of an internal combustion engine the by-pass flow section of the filter element will continue to permit filtered oil to pass therethrough in sufficient quantity to lubricate the engine parts.

Another object of the present invention is to provide a surface type pleated paper filter element provided with by-pass and full flow rate sections therein which increase the useful service life of the filter element while progressively filtering all of the oil passed therethrough to a high degree of efficiency.

Another object of the present invention is to provide a surface type full flow paper filter element having different flow rate sections therein which eliminates problems of matting, channeling, non-uniform porosity and low efficiency filtration commonly encountered in a depth or bulk type fibrous filtering mass.

Another object of the present invention is to provide a full flow paper filter element having different flow rate sections therein made from a continuous or single sheet of paper material.

Other objects and advantages of the present invention will be readily apparent from the following description when considered in connection with the accompanying drawing forming a part thereof and in which FIG. 1 is a diagrammatic view illustrating several steps of making the full flow filter element of the present invention from a continuous roll of prefabricated paper having sections of different porosity.

Figure 1:
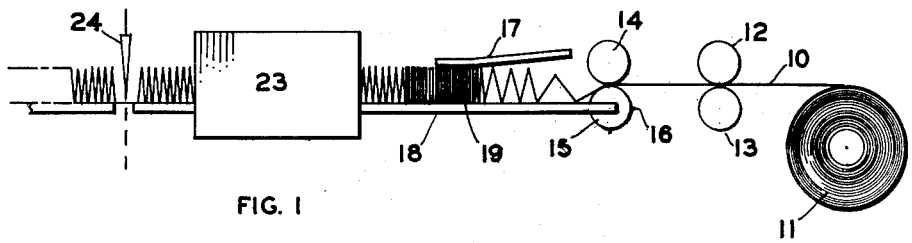

Referring to FIG. 1 of the drawings, a continuous strip of filter paper 10 which has been conventionally impregnated with resin such as phenolformaldehyde is fed from a paper spool or roll 11 between cooperating rollers 12 and 13 which score the paper lengthwise. Thereafter the paper passes between cooperating rollers 14 and 15 having conventional scoring blades 16 thereon which provide transverse creases in the longitudinally moving strip of paper. Rolls 14 and 15 discharge the paper into a restricted space provided by cooperating horizontal friction plates 17 and 18 which slow down the speed of the strip of paper and cause it to bend back and forth along its creased or scored lines as indicated in the drawing to form the uniform pleats 19 illustrated therein. The rotary pleater apparatus does not form any part of this invention but is described in Patent No. 2,771,119 and Patent No. 2,876,555 and is well known in the filter making art.

Figure 8:
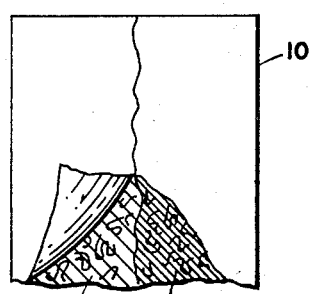
FIG. 8 is a view of a portion of the continuous prefabricated paper with a piece torn away to illustrate sections of different porosity therein.

The roll of resin impregnated paper is prefabricated at the paper mill so that it has different flow rate sections or sections of different density or porosity therein. One section may for example have a porosity of 10 micron size as illustrated by the portion of paper designated 20 in FIG. 8, while another portion of the paper may have a porosity of 25 micron size as indicated by 21. The paper is preferably known as Grade 470 having a porosity of 10 micron size and Grade 233 having the porosity of 25 micron size and may be purchased from Knowlton Bros., Watertown, N.Y., paper supply company and is preferably impregnated with 20% by weight of resin known as No. 8928 resin and obtained from Catalin Corp., Fords, N.J. The distinct flow rate sections run lengthwise of the continuous roll, as best illustrated in FIG. 8. Of course it is also apparent that the free and tight paper may be formed in several alternate strips, rather than in only two distinct strips as shown in the drawing. Each flow rate section preferably comprises approximately 50% of the filter element area and the paper has the same thickness throughout its entire area.

The transversely extending pleats 19 in the strip of paper are fed from the friction plate into a conventional curing oven designated 23 wherein the resin therein is cured in a manner such as described in Patent 2,876,555. After the paper is discharged from the oven it is cut from the continuous strip by a knife edge 24 into successive lengths, each having a predetermined number of pleats therein depending upon the number of pleats required for a predetermined filter element of annular configuration.

Figure 2:
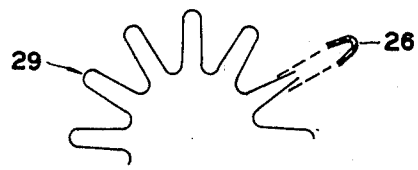
FIG. 2 is a fragmentary plan view illustrating the configuration of an annulus of pleated paper formed from a single sheet of paper before it is clamped together.
Figure 3:
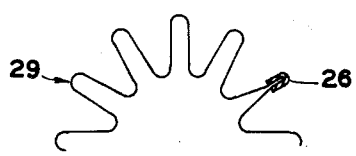
FIG. 3 is a view similar to FIG. 2 illustrating the pleated paper annulus permanently clamped into its final form.
Figure 4:
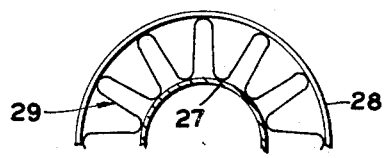
FIG. 4 is a view similar to FIG. 2 illustrating the paper annulus with a center tube inserted in it and a body wrapper disposed about its outer periphery.
Figure 6:
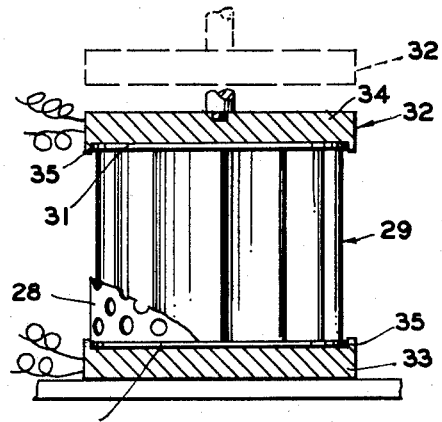
FIG. 6 illustrates the step of permanently sealing the end caps to the filter annulus by heating.
Figure 5:
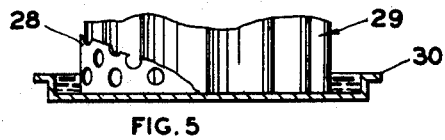
FIG. 5 illustrates the step of applying a bonding agent to the end edges of the paper annulus.
Figure 7:
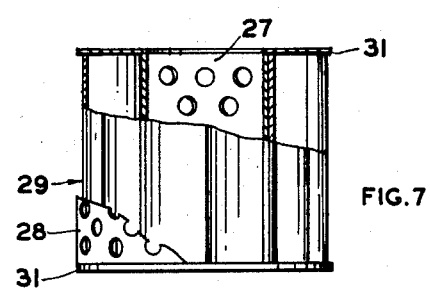
FIG. 7 is a side view, partly broken away, showing the completed filter of the present invention.

The successive lengths of pleated paper are then folded into an annulus such as shown in FIGS. 2 to 4 and the free longitudinal side edges are secured together by a U clamp 26 of equal length slipped over the outer edge of the two adjacent loose sides of the annulus and pressed thereagainst to permanently clamp them together as shown in FIG. 3. Thereafter, a perforated center tube 27 is inserted within the center of the pleated annulus and a perforated paper body wrapper 28 is preferably inserted on the annulus adjacent the outer sides thereof. The assembled filter pack 29, shown in FIG. 4, is then dipped by hand into the trough or container 30 shown in FIG. 5, filled with a liquid cement or adhesive such as phenol-formaldehyde so that all the end edges of the pleats are coated with the adhesive. After both edges of the pack have been dipped in the adhesive, annular paper end caps or discs 31 are bonded thereto to complete the manufacture of the filter element and seal off the pleats. This is accomplished in an electrical heater apparatus 32 provided with circular heater pleats 33 and 34 having circular recesses 35 therein. Plate 33 is stationary while plate 34 is movable as indicated by the dotted lines in FIG. 6. One end cap 31 is placed in recess 35 of plate 33 and pack 29 is inserted thereon while the other end cap 31 is inserted into recess 35 of movable plate 34. Plate 34 is then moved downwardly from the position shown in dotted lines and presses against the upper end cap to force the assembly together while heat is applied thereto to solidify or harden the adhesive and permanently seal the caps to the pack. It has been found that a good seal is provided when the temperature is maintained between 350° F.–380° F. for approximately one and one half minutes, or at 400° F. for approximately one minute.

It is thus apparent from the foregoing description that the present invention provides a pleated paper filter element having two distinct flow rates for the liquid being filtered made from a continuous or single sheet of prefabricated paper. In making the filter cartridge from one piece of paper, instead of more than one, it is obvious that the pleats may be properly dipped in the bonding adhesive and uniformly coated to properly seal the end caps thereto. Hence, the problem encountered where a pleated paper filter cartridge is made from more than one piece of prefabricated paper is eliminated since the use of two or more separate sheets of paper will not provide pleats of equal length because the paper manufacturing mills cannot control the width of a continuous strip of paper made due to variations in the expansion of the paper occurring in paper drying methods in the present day art. For example, if a filter cartridge were made of two separate pieces of paper formed into an annulus, a tolerance of 1/64 of an inch must be allowed because of uncontrollable expansion of the paper during the manufacture thereof so that if one piece of paper is oversized 1/64 of an inch and the other piece of paper with which it is to form the annulus is undersized 1/64 of an inch a difference of 1/32 of an inch in the length of the pleats would occur and hence half of the edges of the pleats would be coated with adhesive for bonding the end cap thereto while the other half would not form a seal due to the lack of adhesive thereon.

Inasmuch as various changes may be made in the particular form and arrangement of the article and in the steps of the process and other sequences as disclosed without departing from the principles of the invention, it will be understood that the invention is not to be limited except by the scope of the appended claims.

What is claimed is:

1. A filter element comprising an annulus of resin impregnated pleated paper, said paper consisting of two different densities to provide high and low flow rate sections, said annulus formed of a continuous sheet of paper, said pleats extending longitudinally of the annulus and being of equal length, an adhesive deposited on the longitudinal edges of said pleats, and end discs secured to said edges by said adhesive to seal off the annulus ends.

2. A filter element comprising an annulus of resin impregnated pleated paper, said paper consisting of two different densities to provide high and low flow rate sections, said annulus formed from a single sheet of paper with said pleats extending longitudinally of the annulus and being of equal length, an adhesive deposited on the upper and lower pleat edges, and annular end discs secured by said adhesive to said edges to seal off the annulus ends.

3. A filter element comprising an annulus of resin impregnated pleated paper, said paper consisting of two different densities providing high and low flow rate sections being parallel to each other and extending horizontally around said annulus, said annulus formed from a continuous sheet of paper, said pleats extending longitudinally of the annulus and being of equal length, an adhesive deposited on the upper and lower pleat edges, and end discs secured by said adhesive to said edges to seal off the annulus ends.

References Cited in the file of this patent

UNITED STATES PATENTS

| | | |
|---|---|---|
| 1,009,365 | Wirt | Nov. 21, 1911 |
| 2,279,423 | Vokes | Apr. 14, 1942 |
| 2,395,449 | Briggs | Feb. 26, 1946 |
| 2,642,187 | Bell | June 16, 1953 |
| 2,748,949 | James | June 5, 1956 |
| 2,850,168 | Nostrand | Sept. 2, 1958 |